United States Patent [19]

Tinschert et al.

[11] Patent Number: 5,772,556

[45] Date of Patent: Jun. 30, 1998

[54] PROCESS FOR THE CYCLIC ADAPTATION OF A CHARACTERISTIC FOR GEAR-CHANGING IN AN AUTOMATIC GEARBOX OF A MOTOR VEHICLE

[75] Inventors: Friedo Tinschert, Ludwigsburg; Rainer Wuest, Stuttgart, both of Germany

[73] Assignee: Mercedes-Benz AG, Germany

[21] Appl. No.: 625,139

[22] Filed: Apr. 1, 1996

[30] Foreign Application Priority Data

Mar. 31, 1995 [DE] Germany ..................... 195 11 866.9

[51] Int. Cl.[6] .................................................. F16H 61/02
[52] U.S. Cl. ........................ 477/110; 477/115; 477/121
[58] Field of Search ................................. 477/110, 115, 477/120, 121; 364/462.1

[56] References Cited

U.S. PATENT DOCUMENTS

| | | | |
|---|---|---|---|
| 5,063,510 | 11/1991 | Jurgens et al. ..................... 364/424.1 |
| 5,157,609 | 10/1992 | Stehle et al. ........................ 477/120 X |
| 5,233,523 | 8/1993 | Follmer . | |
| 5,323,667 | 6/1994 | Tweed et al. ........................... 477/107 |
| 5,417,625 | 5/1995 | Yamaki et al. ...................... 477/110 X |
| 5,455,767 | 10/1995 | Staerker . | |
| 5,470,288 | 11/1995 | Palansky et al. ........................ 477/110 |
| 5,470,290 | 11/1995 | Minowa et al. ......................... 477/115 |
| 5,496,227 | 3/1996 | Minowa et al. ..................... 477/110 X |
| 5,581,465 | 12/1996 | Adler et al. ........................ 364/431.07 |
| 5,603,673 | 2/1997 | Minowa et al. ......................... 477/110 |

FOREIGN PATENT DOCUMENTS

| | | |
|---|---|---|
| 0 366 283 | 5/1990 | European Pat. Off. . |
| 0 512 596 | 11/1992 | European Pat. Off. . |
| 0 531 567 | 3/1993 | European Pat. Off. . |
| 42 15 406 | 11/1993 | Germany . |
| 58-30554 | 2/1983 | Japan . |
| 63-67449 | 3/1988 | Japan . |
| 6-193723 | 7/1994 | Japan . |

*Primary Examiner*—Khoi Q. Ta
*Assistant Examiner*—Peter T. Kwon
*Attorney, Agent, or Firm*—Evenson, McKeown, Edwards & Lenahan, P.L.L.C.

[57] ABSTRACT

In an arrangement for the cyclic adaptation of a characteristic for the changes in an automatic gearbox, a gear-change strategy which determines correction values by an algorithm that correlates external influencing variables and by a process involving evaluation of measured actual values of the influencing variables is used to adapt the characteristic both in the direction of the coordinate indicating a parameter dependent on the speed of travel and in the direction of the coordinate indicating a parameter associated with the engine torque. The process of adaptation is performed as a function of respectively associated correction values.

13 Claims, 12 Drawing Sheets

INTERPOLATION-POINT OF THE GEAR-CHANGE
CHARACTERISTICS :dkw_h(gakt,i)/nab_h(gakt,i)
INTERPOLATION-POINT VALUES :nab_h(gakt,kd)
FOR KICK-DOWN
dkw_h=NUMERICAL VALUES FOR THE THROTTLE-VALVE ANGLE
nab_h=NUMERICAL VALUES FOR THE GEARBOX OUTPUT SPEED
gakt =CURRENT GEAR = 1 TO 5
i =INTERPOLATION-POINT NUMBER = 1 TO 7

INTERPOLATION-POINT OF THE GEAR-CHANGE
CHARACTERISTICS            :dkw_r(gakt,i)/nab_r(gakt,i)
INTERPOLATION-POINT VALUES :nab_r(gakt,kd)
FOR KICK-DOWN
dkw_r=NUMERICAL VALUES FOR THE THROTTLE-VALVE ANGLE
nab_r=NUMERICAL VALUES FOR THE GEARBOX OUTPUT SPEED
gakt  =CURRENT GEAR = 1 TO 5
i     =INTERPOLATION-POINT NUMBER = 1 TO 7 ddkw_h: CORRECTION VALUE FOR THE UPSHIFT CHARACTERISTICS
ddkw_r: CORRECTION VALUE FOR THE DOWNSHIFT CHARACTERISTICS IDLING SPEED LIMIT: nab_h(gakt,1)+dnab_h_lg
FULL-LOAD SPEED LIMIT: nab_h(gakt,1)+dnab_h_vg
KICK-DOWN SPEED LIMIT: nab_h(gakt,kd)−dnab_h_kd
dnab_h_lg: CORRECTION VALUE FOR THE IDLING RANGE
dnab_h_vg: CORRECTION VALUE FOR THE FULL-LOAD RANGE
dnab_h_kd: CORRECTION VALUE FOR THE KICK-DOWN RANGE IDLING SPEED LIMIT: nab_r(gakt,1)+dnab_r_lg
FULL-LOAD SPEED LIMIT: nab_r(gakt,1)+dnab_r_vg
KICK-DOWN SPEED LIMIT: nab_r(gakt,kd)-dnab_r_kd
dnab_r_lg: CORRECTION VALUE FOR THE IDLING RANGE
dnab_r_vg: CORRECTION VALUE FOR THE FULL-LOAD RANGE
dnab_r_kd: CORRECTION VALUE FOR THE KICK-DOWN RANGE IDLING SPEED LIMIT: $nab\_r(gakt,1)+dnab\_r\_lg$
FULL-LOAD SPEED LIMIT: $nab\_r(gakt,1)+dnab\_r\_vg$
KICK-DOWN SPEED LIMIT: $nab\_r(gakt,kd)-dnab\_r\_kd$
dnab_r_lg: CORRECTION VALUE FOR THE IDLING RANGE
dnab_r_vg: CORRECTION VALUE FOR THE FULL-LOAD RANGE
dnab_r_kd: CORRECTION VALUE FOR THE KICK-DOWN RANGE IDLING SPEED LIMIT: nab_r(gakt,1)+dnab_r_lg
FULL-LOAD SPEED LIMIT: nab_r(gakt,1)+dnab_r_vg
KICK-DOWN SPEED LIMIT: nab_r(gakt,kd)−dnab_r_kd
dnab_r_lg: CORRECTION VALUE FOR THE IDLING RANGE
dnab_r_vg: CORRECTION VALUE FOR THE FULL-LOAD RANGE
dnab_r_kd: CORRECTION VALUE FOR THE KICK-DOWN RANGE

PROCESS FOR THE CYCLIC ADAPTATION OF A CHARACTERISTIC FOR GEAR-CHANGING IN AN AUTOMATIC GEARBOX OF A MOTOR VEHICLE

BACKGROUND AND SUMMARY OF THE INVENTION

The invention relates to a process for the cyclic adaptation characteristic for the change from one gear to another gear with adjacent transmission ratios in an automatic gearbox of a motor vehicle. The gear-change points on the characteristic are determined by coordinate values of a characteristic map in which a parameter dependent on the speed of travel is plotted against a parameter associated with the engine torque or vice versa. In accordance with a gear-change strategy which, in each computational cycle, determines a correction value by an algorithm that correlates vehicle-specific and driving-state-specific influencing variables and by evaluation of measured actual values of the influencing variables, the characteristic is adapted to the change in the influencing variables as a function of the respective correction value.

In a known process of the above-mentioned type described in European Patent document EP 0 531 567 A1, a gear-change strategy is adopted which describes the longitudinal movement of a motor vehicle by an algorithm which correlates the acceleration of the gearbox output shaft of the gearbox with the transmission ratio of the current gear, with the turbine torque of a hydrodynamic torque converter situated in the power transmission path between the engine and the gearbox, with the reaction torque of the vehicle, and with the moment of inertia of the vehicle. According to this gear-change strategy, the deviations of an output speed, calculated via the algorithm for the instantaneous operating point, from a measured output speed are used to determine the respective correction values. The correction values can be used either to select a characteristic suitable for the instantaneous driving state for the changes from one gear to another gear from a plurality of stored characteristics or merely to adapt the coordinate values of the vehicle-speed-dependent parameter of a single characteristic. The known gear-change strategy is used essentially to accommodate changes in the state of the road with respect to upward and downward slopes and changes in the vehicle loading.

In another known arrangement described in European Patent document EP 0 512 596 A1 for the cyclic adaptation of a characteristic, a gear-change strategy is adopted which describes the motive power of a motor vehicle by an algorithm. The algorithm correlates a theoretical excess of motive power with the motive power of the engine and with the total resistance to motion of the motor vehicle. According to this gear-change strategy, a correction value is determined as a function of the theoretical excess of motive power only for the coordinate value of that parameter of the characteristic map which is associated with the engine torque. This correction value is used without distinction both to adapt the characteristic for the upshifts and to adapt the associated characteristic for the downshifts between two adjacent gears. The adaptation is performed indirectly in such a way that the correction value is added to the respectively measured actual value of the coordinate, thereby shifting the two gear-change points of the characteristics towards higher vehicle speeds.

Finally, German Patent document DE 42 15 406 A1 describes a control system for gear-changing in an automatic gearbox. The control system operates with a device for detecting input variables derived from a driver/vehicle system, a device for generating fuzzy sets for the input variables and a device for selecting gearbox ratios. The devices for detecting the input variables, for generating the fuzzy sets, and for selecting gearbox ratios interact in such a way that output variables which are used to determine a gearbox ratio are obtained in accordance with fuzzy logic production rules. This known control system is based on the belief that previous control systems have commonly either applied fuzzy logic methods in an inadequate way or have used them merely when considering special driving situations or, if special driving situations were to be considered in addition to normal driving operation, have been expanded into complex, non-optimized control mechanisms involving long computing times and based on a large number of rules. Allegedly, none of the systems known up to that point were capable of adapting the gear-change behavior rapidly and effectively to practical requirements. In order therefore to take into account assessment criteria such as performance, consumption and complexity and to allow an efficient response to be made to special characteristics such as driving style and driving state by changing the gear-change behavior when required by activating adaptive gear-change strategies, while using fuzzy methods in the design of the gear-change strategy, provision is made in the known control system of the German Patent document for the totality of the fuzzy production rules to be divided into the following fractions: (a) a basic set of fuzzy production rules for determining the gear-change point, with the basic set defining a consumption-optimized driving style, (b) an adaptation set of fuzzy production rules for modifying the basic set of rules as a function of a current driving style ranging from a consumption-oriented driving style to a performance-oriented driving style, and (c) an identification set of fuzzy production rules for identifying a driver by his driving style, which set may range from a consumption-oriented driving style to a performance-oriented driving style. Compared with a process of the generic type, this known control system is consequently based on a fundamentally different procedure, in which a gear-change characteristic map is not used. This known control system leads to the following disadvantages: 1) the influencing of the set of fuzzy rules changes the gear-change behavior of the automatic gearbox fundamentally over the entire driving range; 2) it is not possible to modify the gear-change behavior only in certain driving ranges; 3) it is not possible to increase the hysteresis between the upshift and downshift characteristics; and 4) it is not possible to carry out changes in the gear-change behavior for individual driving states separately from all the others.

There is therefore needed a process which influences the gear-change behavior of an automatic gearbox in order to adapt it to different driving states without, in the process, being dependent on fuzzy logic methods, which require a large amount of computing power, or on the storage of a plurality of gear-change characteristic maps. The intention is that the respective adaptation of a characteristic for the changes between two gears should be effective not only in one direction, i.e. only for one coordinate of the characteristic map, but for both coordinates.

According to the present invention, these needs are achieved in an advantageous manner by a process for the cyclic adaptation of a characteristic for the change from one gear to another gear with adjacent transmission ratios in an automatic gearbox of a motor vehicle. The gear-change points on the characteristic are determined by coordinate values of a characteristic map in which a parameter dependent on the speed of travel is plotted against a parameter associated with the engine torque or vice versa. In accordance with a gear-change strategy which, in each computational cycle, determines a correction value by an algorithm that correlates vehicle-specific and driving-state-specific influencing variables and by evaluation of measured actual values of the influencing variables, the characteristic is adapted to the change in the influencing variables as a function of the respective correction value. A correction value is established for each of the two coordinate values indicative, respectively, of speed & torque of selected gear-change points. A common correction value is determined for two selected adjacent gear-change points. The common correction value serves for the adaptation of their coordinate values for the parameter associated with the engine torque.

In the process according to the invention, a permanently stored characteristic map is modified.

The process according to the invention provides a method for enabling a conventionally stored characteristic map to be modified with the aid of three correction values in such a way that the characteristic (gear-change characteristic) can adopt any desired shape.

The process according to the invention further provides a method by which upshift and downshift characteristics can be modified (adapted) independently of one another.

In the process according to the invention, coordination of correction values is made possible.

The process according to the invention provides a method of handling the correction values when different correction values are generated for the same coordinate value.

In the process according to the invention, a set of three correction values by which gear-change characteristics can be modified in accordance with fixed rules is defined.

In one embodiment of the present invention, two limiting speeds are defined and control of their action is exercised in order to modify gear-change characteristics in one coordinate direction.

In the process according to the invention, the correction values act independently of one another and can also be used individually.

In the process according to the invention, infinitely variable modification of the gear-change characteristics to any desired shape is possible.

In the process according to the invention, modification of the entire characteristic map or of just one area of the characteristic map or of small, isolated portions of individual gear-change characteristics is made possible. This modification can be implemented separately for the upshift and downshift characteristics.

The process according to the invention provides the advantages that by virtue of the "standardization" of three correction values and the rules relating to them, the invention for modifying a stored gear-change characteristic map is not tied to particular gear-change strategies. Further, the gear-change strategies can be configured in any way desired as long as they keep to the rules for the three correction values when influencing the stored gear-change characteristic map.

It is a further advantage that each gear-change strategy has only to generate those correction values which are necessary to achieve their specific task.

Also advantageously, the gear-change strategies can generate correction values completely independently of one another. As a result, they can be designed for and adapted to a particular driving state without compromise.

It is a further advantage that if several gear-change strategies generate different correction values for the same coordinate at the same time, their action on the gear-change characteristic map can be coordinated without problems according to the invention.

The present invention makes it possible to construct the software program in modular form. This means that it is no problem to omit or modify gear-change strategies or to incorporate additional gear-change strategies.

The gear-change program of an automatic gearbox determines the change from one gear to another. A well-designed gear-change program is an important characteristic of the gearbox when it comes to the satisfaction of the customer. It should select the optimum gear in every driving situation. In order to ensure this, the gear-change program must satisfy the following conditions: It must change gear in such a way that the vehicle uses little fuel. This means that the gear with the smallest ratio is selected at low speeds and that the gearbox changes down only at low speeds and large accelerator-pedal travels so as to operate the engine for as long as possible in ranges which are favorable in terms of fuel consumption. It must make available the full performance of the vehicle when required. A performance oriented gear-change program changes up only at a relatively high speed, makes full use of the available engine revs, and changes down in response to relatively small accelerator-pedal travels. It must adapt to the upward slope of the road and/or the loading of the vehicle in order to guarantee good drivability and to avoid frequent changes back and forth. It must adapt to the downward slope of the road in order to exploit the braking action of the engine and to reduce the load on the vehicle brake. It must adapt to the reduction in engine torque with increasing altitude in order to ensure the same driving characteristics as at sea level. It must prevent automatic gear changes and gear changes initiated manually by the driver via the selector lever which lead to impermissibly high engine speeds, while taking into account influences such as the vehicle acceleration and the engine and gearbox temperature. It must cooperate with other electronic control units in the vehicle, e.g. the engine control unit, traction control system, cruise controller etc., in such a way that they operate in an optimum manner at all times.

Gear-change programs are configured in such a way that upshifts are triggered by increasing vehicle speed or release of the accelerator pedal and downshifts are triggered by changes of state in the opposite direction. This setting is appropriate for most driving situations. In order to be able to meet all the requirements mentioned above, however, the gear-change program has to be adapted in special driving situations.

To adapt the gear-change program to the respective driving situation, it is necessary to detect the instantaneous driving state such as, for example, the upward slope of the road, altitude or vehicle loading, and to evaluate and assess the driver's behavior. This invention relates to the modification of the instantaneous gear-change program on the basis of the data obtained by the assessment.

Instead of a large number of different gear-change characteristic maps, the present invention makes provision for the storage of just one gear-change characteristic map, referred to as the basic gear-change program. Any desired configuration can be adopted for the basic gear-change program. The configuration chosen is ideally one which is adapted to the most frequently occurring driving state, for example a consumption-optimized gear-change characteristic map for the unladen vehicle on a straight road at sea level. This basic gear-change program is adapted in a continuously variable manner in each computational cycle to the respectively prevailing driving situation by the methods according to the invention.

Other objects, advantages and novel features of the present invention will become apparent from the following detailed description of the invention when considered in conjunction with the accompanying drawings.

DETAILED DESCRIPTION OF THE DRAWINGS

Figure 1:
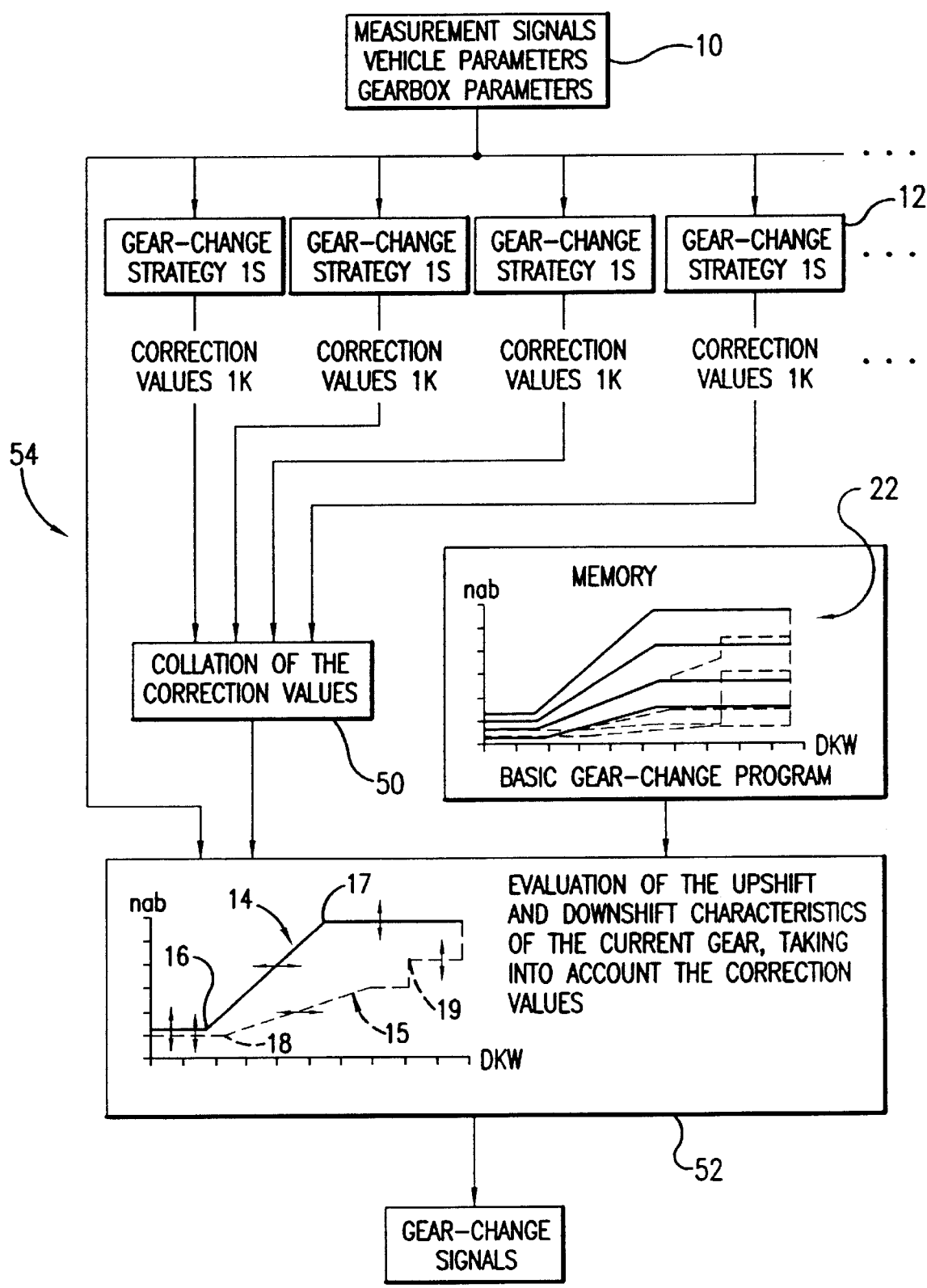
FIG. 1 is diagrammatic representation of a process in accordance with the invention for adapting a gear-change program to different driving situations.

FIG. 1 illustrates the basic mode of operation. A defined number of vehicle and gearbox variables are detected by various sensors and control units 10. These variables are used in the electronic gearbox control system (EGS) 54 as input signals for the gear-change strategies 12. Gear-change strategies 12 are algorithms which, through the use of these input signals, detect the instantaneous driving situation, evaluate it, and generate appropriate correction values to adapt the basic gear-change program to the particular driving situation. Each gear-change strategy 12 encompasses only a very specific driving state and generates correction values only for this state. The correction values of all the gear-change strategies 12 are collated 50 and the basic gear-change program 22 is then corrected 52, taking into account these resulting correction values, in order to determine the gear required for the instantaneous driving situation.

The electronic gearbox control system (EGS) 54 will readily be understood by those skilled in the art to be a computer or processor programmed in accordance with the present invention. The present invention describes the description of the correction values generated by the gear-change strategies, their collation and the adaptation of a stored gear-change characteristic map by these correction values.

The term basic gear-change program is used to designate a stored gear-change characteristic map which contains all the upshift and downshift characteristics of the automatic gearbox. Each gear-change characteristic is described by a given number of interpolation points. Each interpolation point is made up of a speed-proportional value (e.g. gearbox output speed, wheel speed or vehicle speed) and an engine-load-proportional value (e.g. throttle-valve angle, engine torque or accelerator-pedal travel). In all the explanatory passages below, the throttle-valve angle (DKW) will serve to represent the engine-load-proportional value and the gearbox output speed (nab)-also referred to as output speed-will serve to represent the speed-proportional value.

The upshift characteristics 14 (FIG. 2) are each described by seven interpolation points, and the downshift characteristics 15 (FIG. 3) are each described by nine interpolation points. In the evaluation of the basic gear-change program 22, linear interpolation is performed between these interpolation points. Another interpolation point, consisting solely of an output-speed value, is additionally stored for each gear-change characteristic. It is only taken into account if the driver actuates a kick-down switch.

Figure 2:
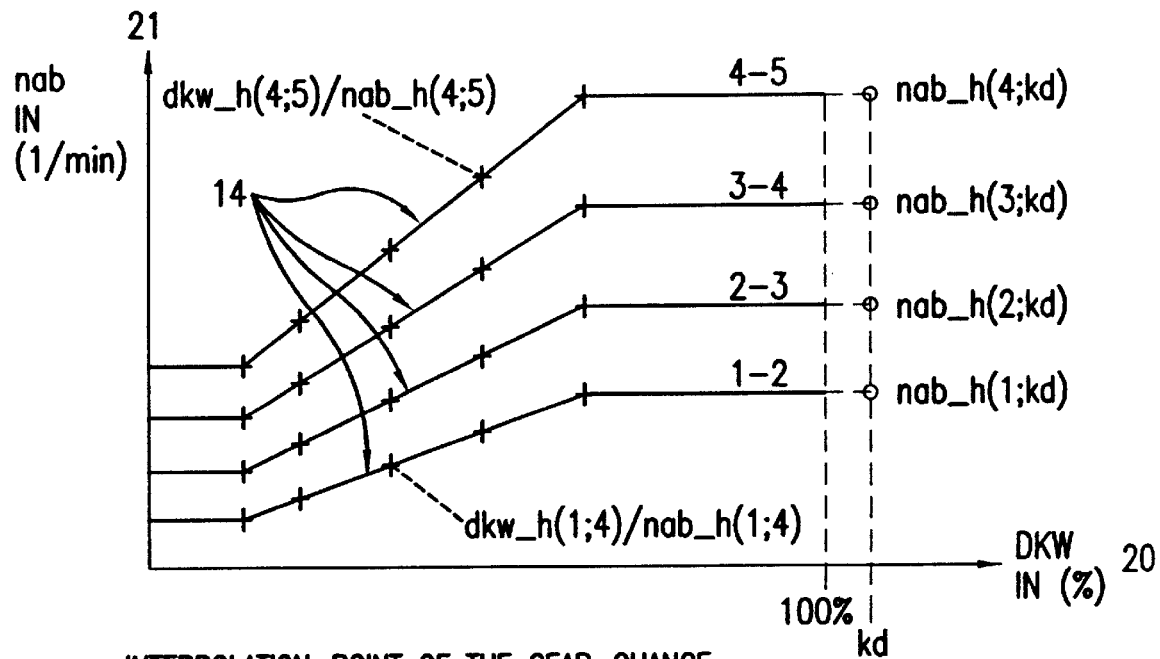
FIG. 2 is a graphical illustration of the upshift characteristics of the basic gear-change program of FIG. 1 using selected interpolation points.
Figure 3:
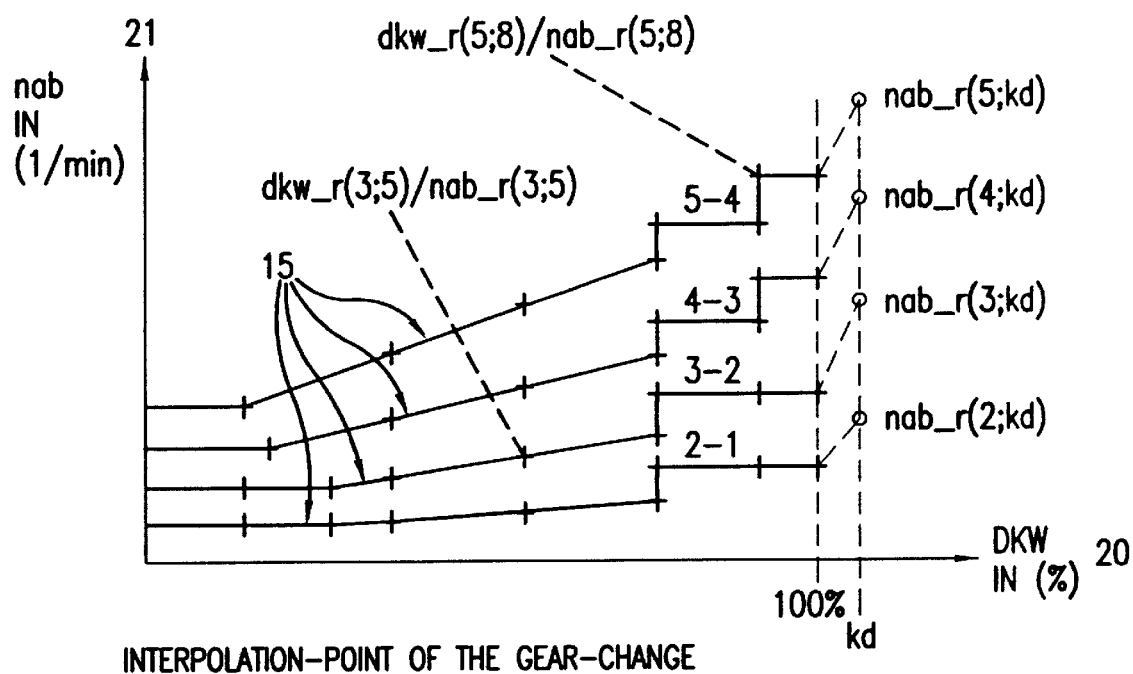
FIG. 3 is a graphical illustration of the downshift characteristics of the basic gear-change program of FIG. 1 using selected interpolation points.

FIGS. 2 and 3 illustrate how the gear-change characteristics of the basic gear-change program are described with the aid of the interpolation points, and each gives two examples of the designation of interpolation points for the gear-change characteristics and that of all the kick-down interpolation points.

In the evaluation of the basic gear-change program, consideration is only ever given to the gear currently engaged. The instantaneous throttle-valve angle DKW is used to determine the output-speed values nab of the upshift and the downshift characteristic for the currently engaged gear from the gear-change characteristic map. These values are compared with the gearbox output speed measured. If the measured gearbox output speed is higher than the output-speed value of the upshift characteristic, the next gear up is selected while, if it is lower than the output-speed value of the downshift characteristic, the next gear down is selected. If neither is the case, the current gear is retained.

The basic gear-change program can be modified in the direction of the abscissa and in the direction of the ordinate by the use of correction values ddkw and dnab. The correction values are generated by the gear-change strategies 12 (FIG. 1) as a function of the input signals and are taken into account in the evaluation of the basic gear-change program. Since the electronic gearbox control system 54 evaluates the gear-change strategies and the basic gear-change program at a frequency of up to 100 times per second, the correction values are valid for the instantaneous driving state and the current gear. They are recalculated and updated in each computational cycle.

The basic gear-change program is influenced in the direction of the abscissa by addition of a correction value ddkw to the instantaneously measured throttle-valve angle DKW. The procedure involved is therefore one of indirect modification of the basic gear-change program, in which the modified gear-change characteristics are generated by manipulation of the input signal DKW during evaluation of the basic gear-change program.

Figure 4:
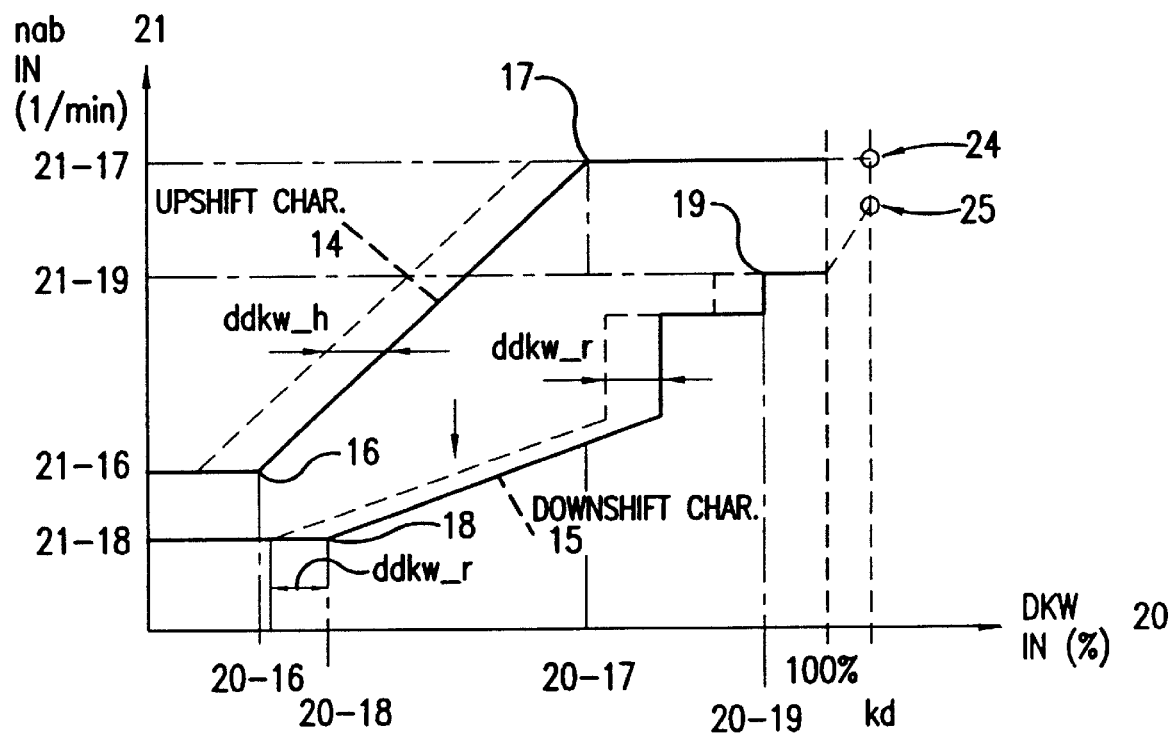
FIG. 4 is a graphical illustration of the influencing of the basic gear-change program of FIG. 1 as regards the coordinate (abscissa) for the parameter associated with the engine torque.

The correction value to be added is generated by the gear-change strategies and can be specified separately for the upshift (ddkw_) and downshift (ddkw_r) characteristics and can have a positive or negative sign. By virtue of the principle on which it operates, it acts on all the gear-change characteristics simultaneously. FIG. 4 illustrates the effects on the gear-change characteristic map using the example of an upshift and a downshift characteristic.

Figure 5:
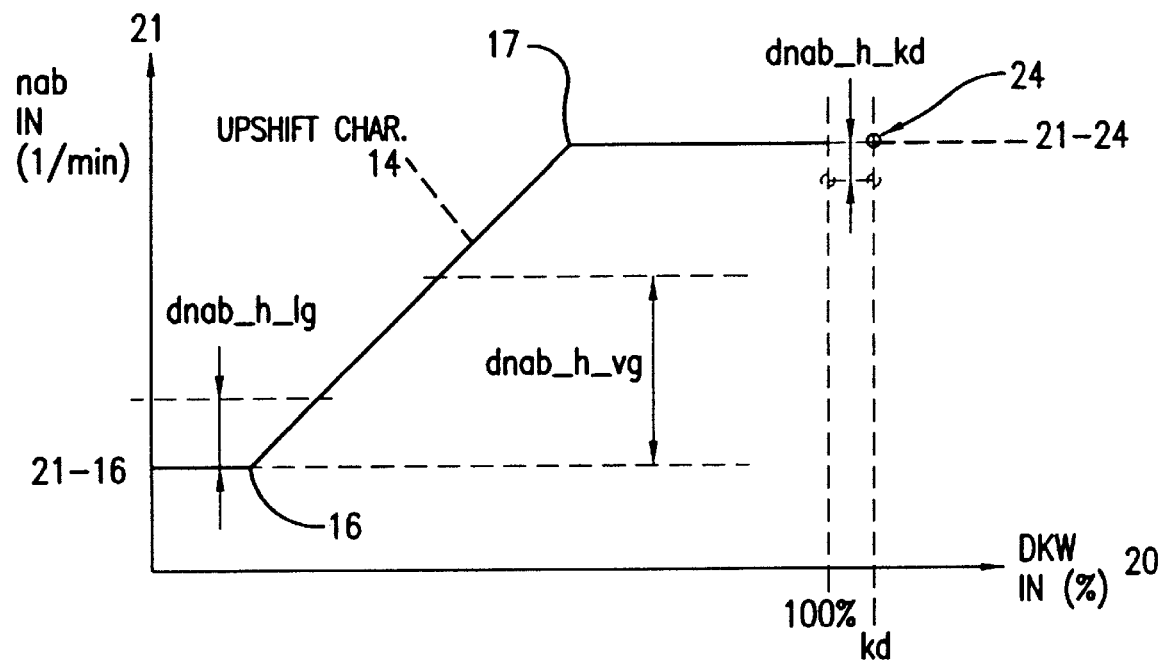
FIG. 5 is a graphical illustration of the influencing of the basic gear-change program of FIG. 1 as regards the coordinate (ordinate) for the parameter dependent on speed of travel.
Figure 6:
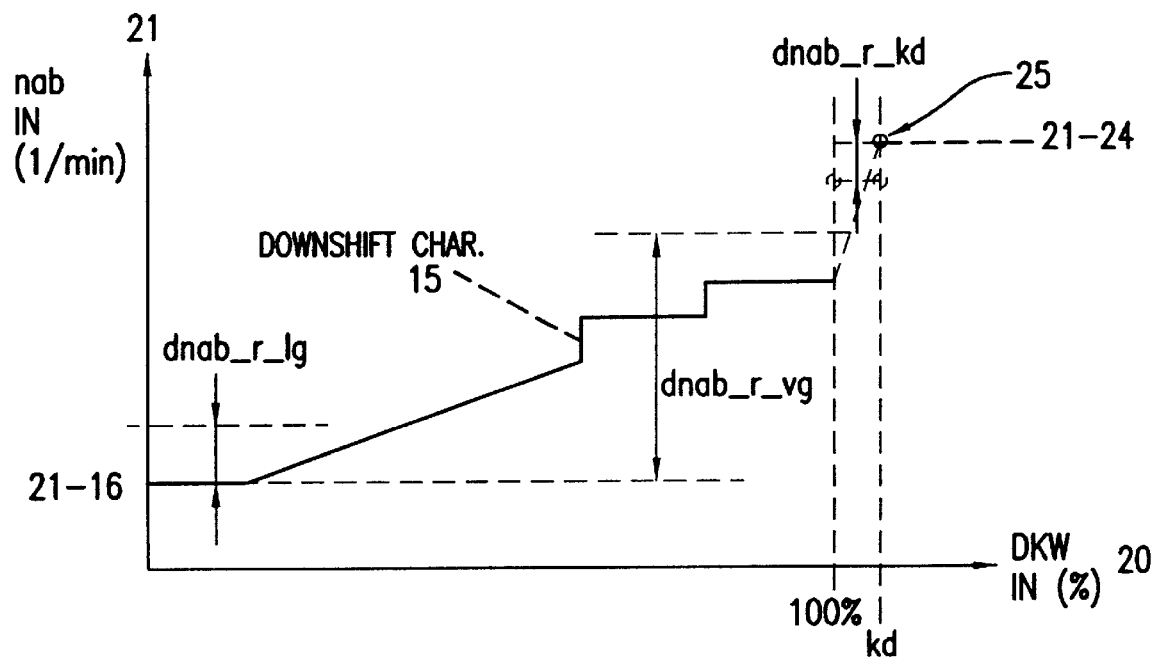
FIG. 6 is a graphical illustration of the influencing of the basic gear-change program shown in FIG. 5 in the case where an adapted portion of the downshift characteristic lies above the downshift characteristic of the basic gear-change program.
Figure 6A:
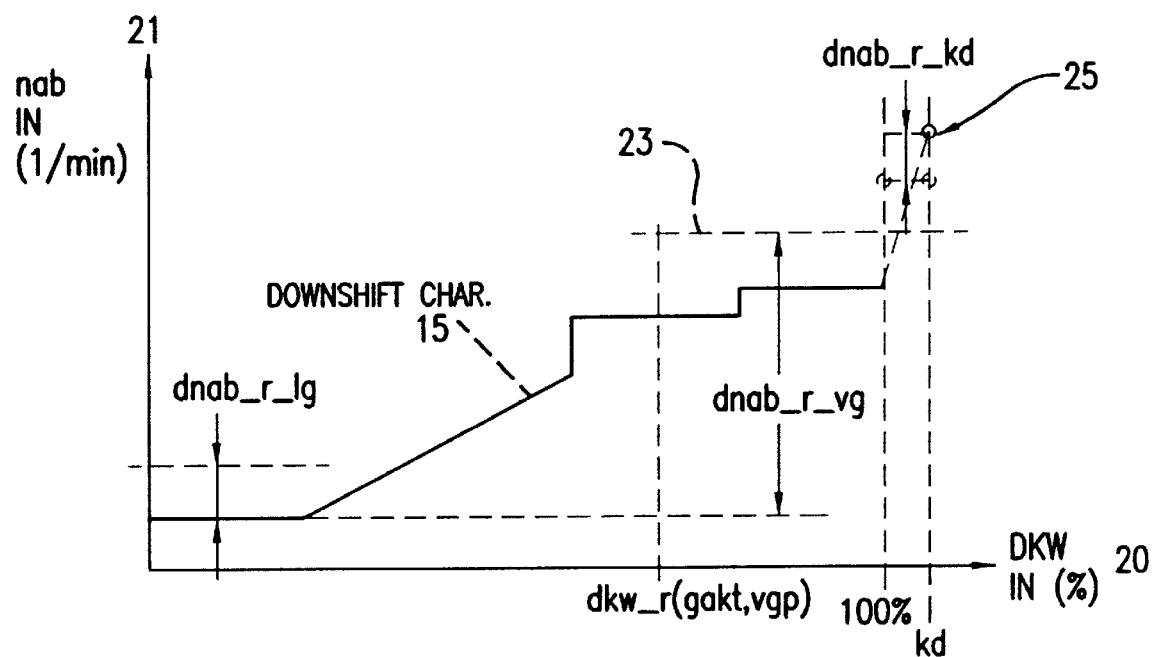
FIG. 6a is a graphical illustration of the influencing of the basic gear-change program shown in FIG. 6 with the introduction of a predetermined constant coordinate value vgp to limit the adapted portion of the downshift characteristic.
Figure 6B:
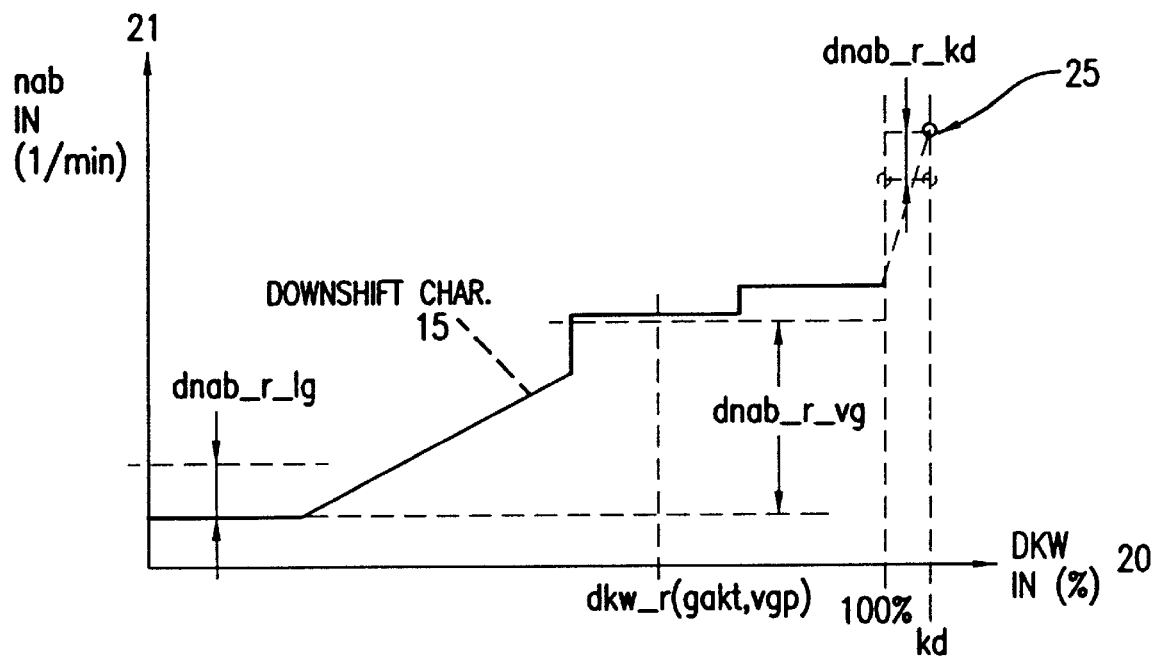
FIG. 6b is a graphical illustration of the influencing of the basic gear-change program shown in FIG. 5 for the case where an adapted portion of the downshift characteristic lies below the downshift characteristic of the basic gear-change program.

To influence the basic gear-change program in the direction of the ordinate, the gear-change strategies produce three different differential speeds (FIGS. 5 and 6). These differential speeds are added to the output-speed value of the first gear-change characteristic interpolation point or subtracted from the kick-down interpolation point. By this means, limiting gear-change speeds for the idling, full-load and kick-down range are formed. Upshifts take place at the earliest above the idling-speed limit and at the latest when the full-load speed limit is exceeded. Between these limits, the gear-change characteristic of the basic gear-change program is valid. In the case of kick-down, the kick-down speed limit takes effect. In the case of downshifts, the situation is reversed. All the limiting speeds can be specified separately for the upshift and downshift characteristics and can have a positive or negative sign. FIGS. 5 and 6 illustrate how the limiting speeds are formed and their effects on the basic gear-change program.

Each gear-change strategy detects and evaluates a specific driving state independently of all the others and calculates one or more of the correction values described, as required, in order to adapt the gear-change behavior of the automatic gearbox to this driving state. In some driving situations, several gear-change strategies can generate different correction values simultaneously, which must then be evaluated and collated. Collation of the correction values is performed separately for the direction of the abscissa and the direction of the ordinate.

Figure 7:
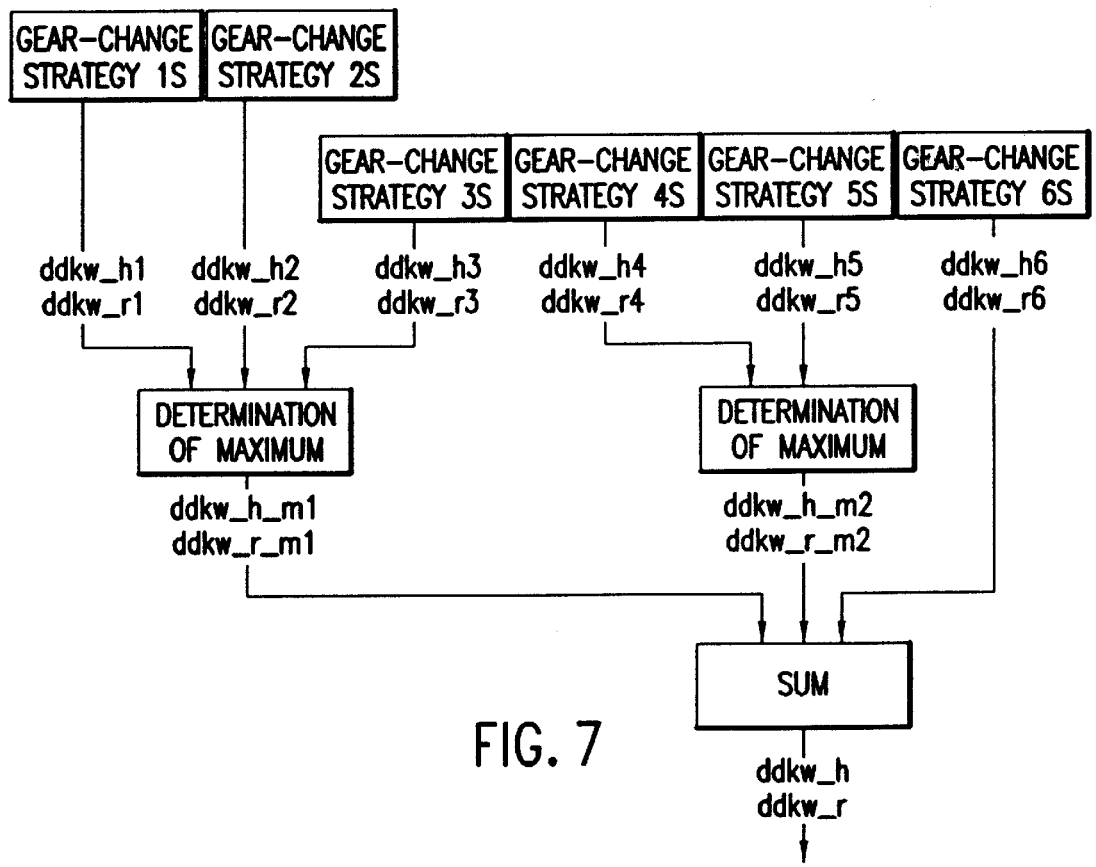
FIG. 7 is a graphical block diagram overview relating to the collation of the correction values of FIG. 1 in relation to the coordinate (abscissa) for the parameter associated with the engine torque.

The simplest method for collation of the correction values is maximum determination. In this case, only the correction variable which has the greatest influence on the basic gear-change program takes effect. There are, however, driving situations in which a gear-change strategy modifies the basic gear-change program and all the other gear-change strategies have to act on this modified gear-change characteristic map. This is achieved by adding correction values. FIG. 7 illustrates the principle of the collation of correction values in the direction of the abscissa. Each gear-change strategy generates correction values separately for the upshift and downshift characteristics, which are collated as required by maximum formation. The maxima or correction values determined are then summed and the result used to evaluate the basic gear-change program.

Figure 8:
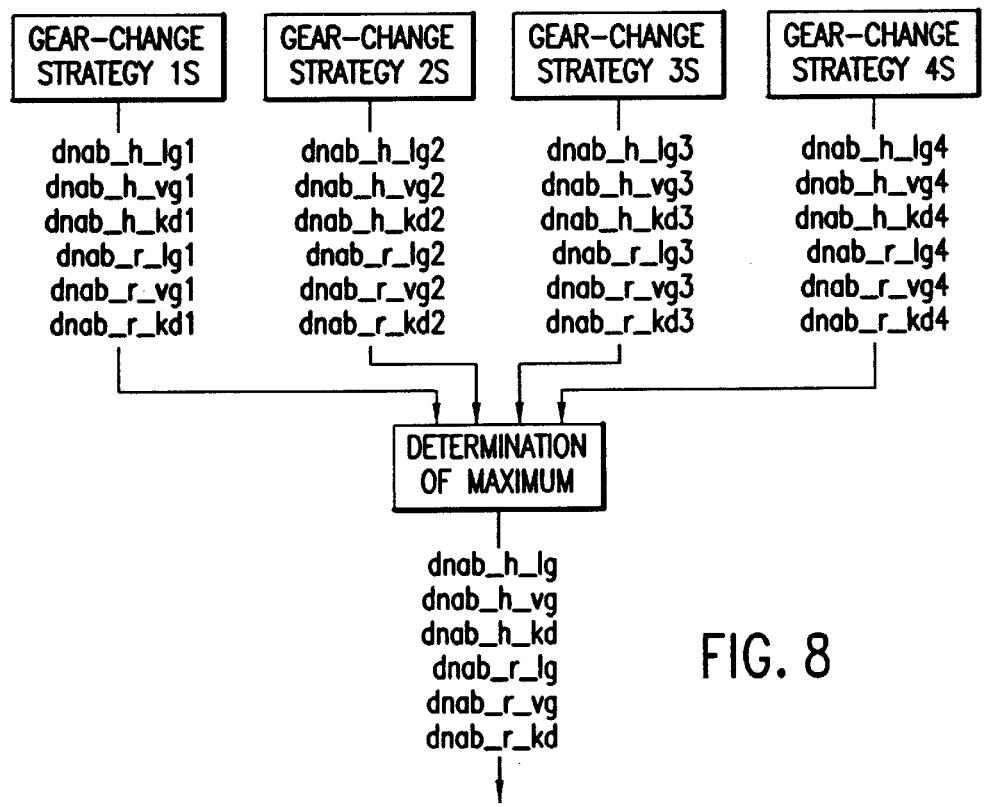
FIG. 8 is a graphical block diagram overview of the collation of the correction values of FIG. 1 in relation to the coordinate (ordinate) for the parameter dependent on the speed of travel.

Since limiting gear-change speeds are generated by the correction values in the direction of the ordinate, the correction value which has the greatest influence on the basic gear-change program is always decisive in this case. Collation is thus always performed exclusively by maximum formation (see FIG. 8).

Figure 9:
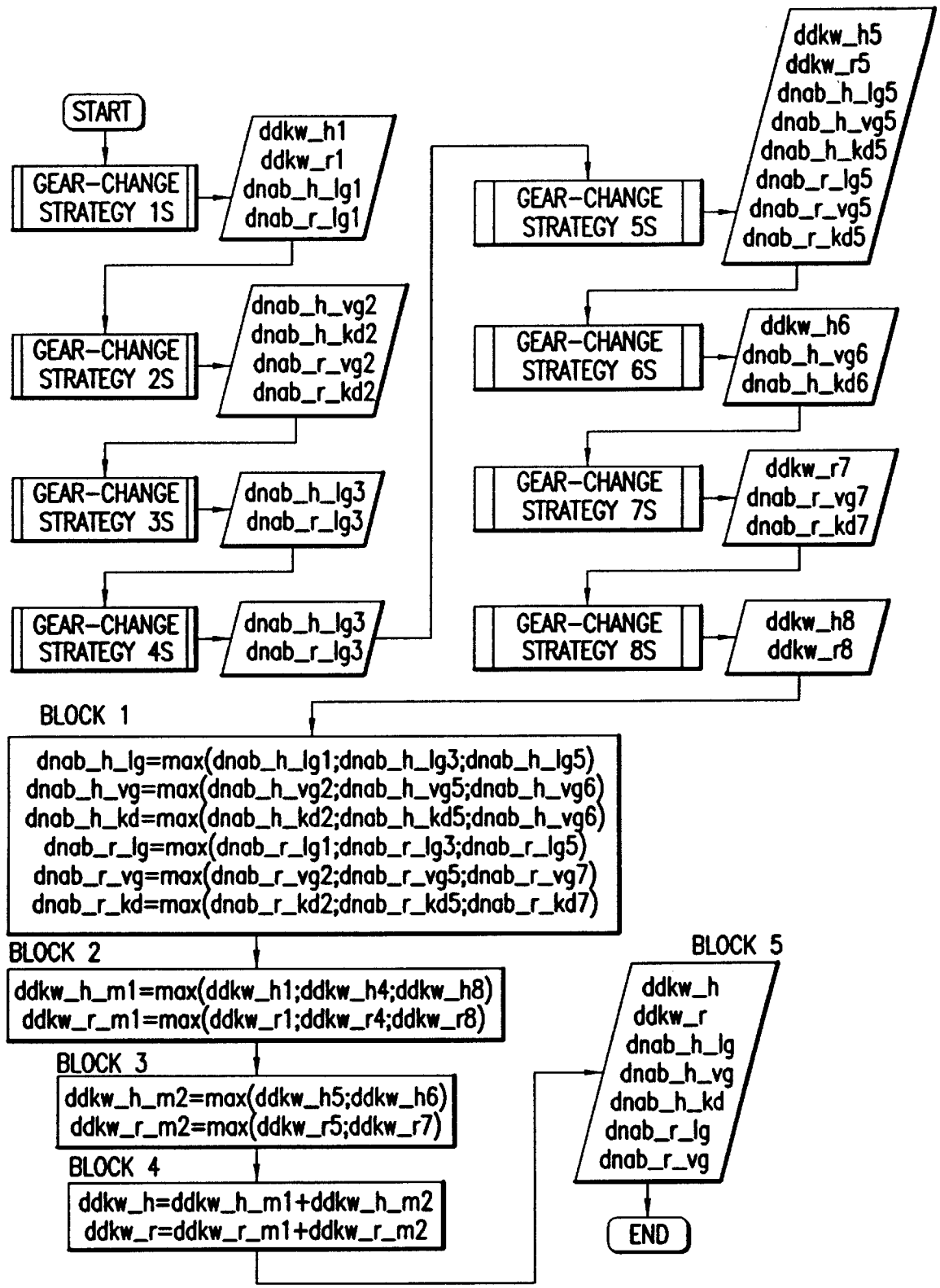
FIG. 9 is a flow chart of the method steps involved in the collation of the correction values of FIG. 1.

FIG. 9 shows an example for a program sequence in the determination of the resulting correction values. Eight different gear-change strategies (1S–8S) each generate different correction values depending on the driving situation. In Block 1, all the correction values in the direction of the ordinate are collated by maximum formation, this being done separately for the idling, full-load and kick-down range. The correction values in the direction of the abscissa are then collated. For this purpose, maximum determination is first of all performed in Blocks 2 and 3, this being done separately for the correction values of gear-change strategies 1S, 4S and 8S and gear-change strategies 5S and 6S. The resulting maxima are then added together in Block 4. The final result is a numerical value for each of the different correction values (Block 5), with which the basic gear-change program is then adapted.

Figure 10:
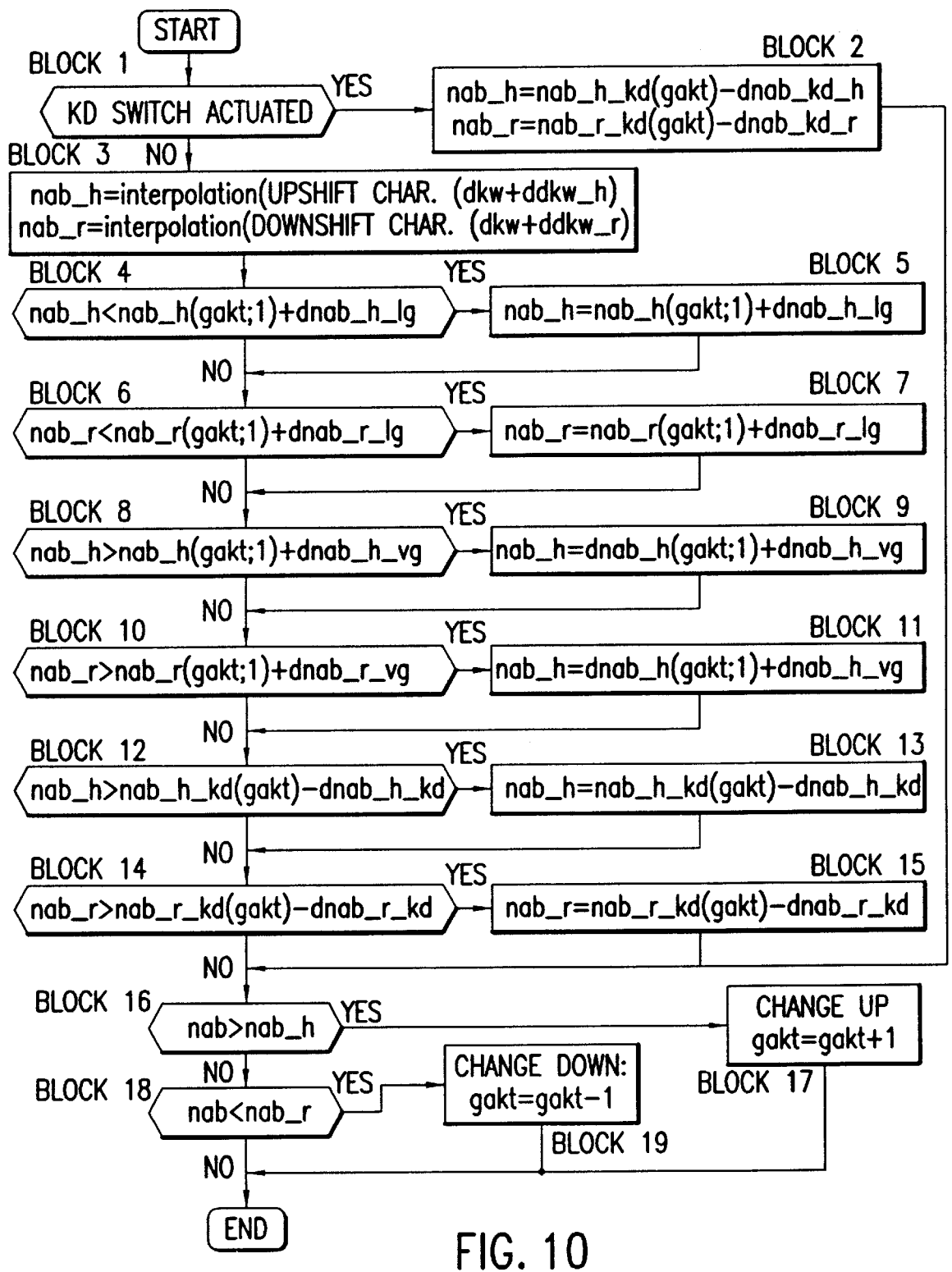
FIG. 10 is a flow chart of the method steps involved in the evaluation of the basic gear-change program taking into account the correction values according to the invention.

FIG. 10 shows how the basic gear-change program is adapted, taking into account the correction values. The system first of all enquires whether the kick-down switch has been actuated. If this is the case, the output-speed values for upshifting and downshifting in the current gear are set to the kick-down speed limits and the program advances to Block 16. Otherwise, the output-speed values of the upshift characteristic and the downshift characteristic of the basic gear-change program are calculated for the current gear, taking into account the correction values ddkw_h and ddkw_r. A check is then made to determine whether the output-speed values determined from the basic gear-change program are below the idling gear-change limits (Blocks 4 and 6) or above the full load (Blocks 8 and 10) or kick-down gear-change limits (Blocks 12 and 14) and corrected accordingly, if required (Blocks 5, 7, 9, 11, 13 and 15). The corrected output-speed values are then compared with the actually measured gearbox output speed nab. If it is higher than the output-speed value nab_h (Block 16), the next gear up is selected (Block 17) while, if it is lower than the output-speed value nab_r (Block 18), the next gear down is selected (Block 19). If neither is the case, the current gear is retained.

The action of the gear-change strategies can be coordinated by maximum formation or summation. As a result, the gear-change behavior of the automatic gearbox is optimally adapted, without additional outlay, even if several driving states occur simultaneously. It is furthermore no problem to omit gear-change strategies or incorporate additional ones.

If vehicles do not have all the input signals required for the gear-change strategies due to differences in equipment specification, the affected gear-change strategies merely send no value for the correction values. In this case, the gear-change characteristic map is not adapted in some driving situations. A change in the program sequence and hence the generation of an additional control-unit variant is not required.

On upward slopes, an upshift should take place only at higher engine speeds, even in the idling range. To this end, the upward-slope detector determines a numerical value dnab_h_lg1.

Independently of this, there may be a requirement, for the purpose of heating up the catalytic converter, that the vehicle should travel in low gears. For this purpose, the converter-heating strategy supplies a numerical value dnab_h_lg2.

Another gear-change strategy can supply a numerical value dnab_h_lg3.

Maximum formation is then as follows:

```
dnab_h_lg  = max {dnab_h_lg1; dnab_h_lg2; dnab_h_lg3; . . .}
or
dnab_h_lg  = dnab_h_lg1, if dnab_h_lg1 > dnab_h_lg2 and
                         dnab_h_lg1 > dnab_h_lg3 and . . .
           = dnab_h_lg2, if dnab_h_lg2 > dnab_h_lg1 and
                         dnab_h_lg2 > dnab_h_lg3 and . . .
           = dnab_h_lg3, if dnab_h_lg3 > dnab_h_lg1 and
                         dnab_h_lg3 > dnab_h_lg2 and . . .
```

On upward slopes, an upshift in the part-throttle range should take place only if the driver releases the throttle to a significantly greater extent than on the flat and, for this purpose, a value ddkw_h1 is formed.

Independently of this, a correction value ddkw_h2 must be taken into account at high altitudes.

The value ddkw_h is thus calculated, taking into account corresponding signs, as follows:

$$ddkw\_h = ddkw\_h1 + ddkw\_h2 + \ldots$$

Figure 11:
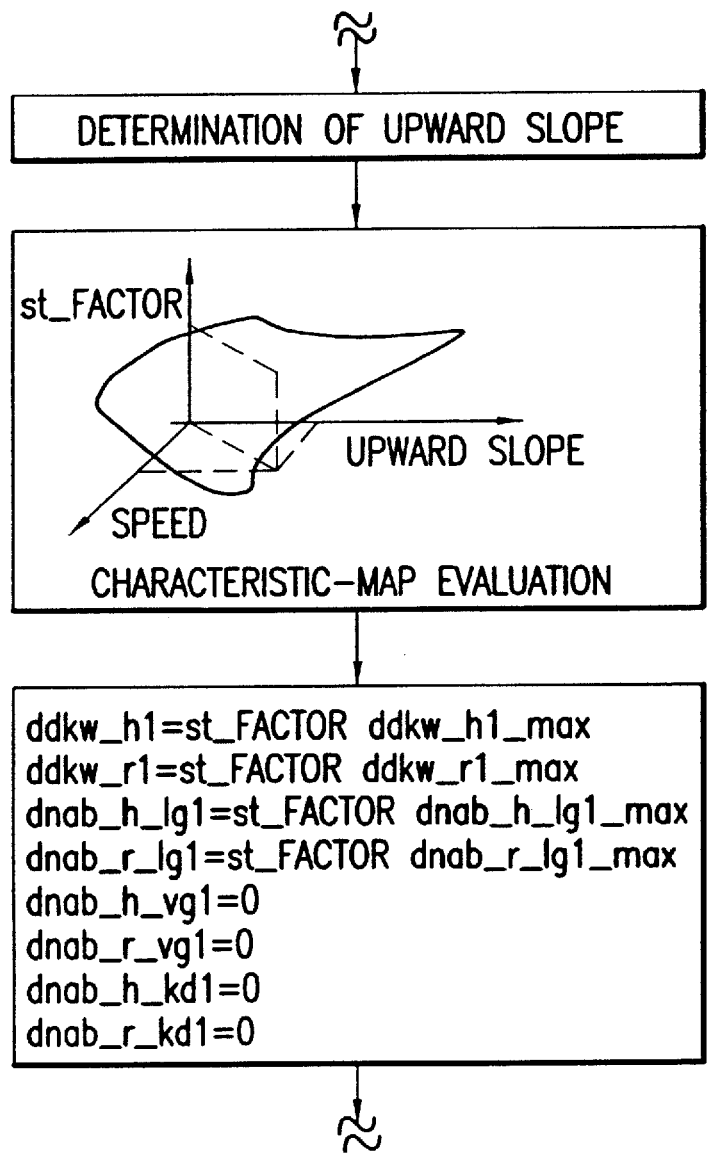
FIG. 11 is a representation of a gear-change strategy to take into account the upward slope of the road.

A description, by way of example, of a gear-change strategy is given with reference to FIG. 11. To illustrate the generation of the correction values of gear-change strategies, an account will be given here by way of example of how a gear-change strategy for taking into account the upward slope of the road determines this. The determination of the upward slope of the road is assumed to be universally known since it is sufficiently well known from the literature and does not form the subject-matter of this patent application. This upward slope value and the speed of the vehicle are used to determine an associated factor $st_{13}$ factor from a characteristic map. This factor and values ddkw_h1_max, ddkw_r1_max, dnab_h_lg1_max, dnab_r_lg1_max permanently stored in the memory of the electronic system are multiplied together and equated with the correction values. Unused correction values are set to zero.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for controlling gear shifting in a motor vehicle by cyclic adaptation of a gear change characteristic in an automatic gearbox thereof, the process comprising the steps of:

providing a characteristic map in which a parameter dependent on a travel speed of the vehicle is plotted against a parameter associated with an engine torque, and which contains a characteristic that has gear change points designated by coordinate values in said map;

adapting said characteristic to a change in influencing variables as a function of correction values, by means of a gear-change strategy which determines the correction values by evaluating measured actual values of the influencing variables, using an algorithm which correlates vehicle-specific and driving-state-specific ones of said influencing variables, in successive computational cycles; and controlling gear changing in said vehicle as a function of the adapted characteristic;

wherein said correction values are established for each of two coordinate values of selected gear-change points of said characteristic; and wherein a common correction value is determined for selected adjacent gear-change points, said common correction value serving to adapt the coordinate values of said selected adjacent gear change points, for the parameter associated with the engine torque.

2. The process according to claim 1, further comprising the step of using a first characteristic for changes into a higher one of the two respectively adjacent gears and using a second characteristic for changes into a lower one of the two respectively adjacent gears;

wherein correction values for selected gear-change points of the first characteristic are established independently of correction values for selected gear-change points of the second characteristic.

3. The process according to claim 2, wherein adaptation of the coordinate value for the parameter associated with the engine torque is performed indirectly by adding a correction value to the respective actual value of the parameter.

4. The process according to claim 1, wherein one of the two selected gear-change points on a characteristic has, for the parameter associated with the engine torque, a coordinate value which falls within an idling range of the characteristic.

5. The process according to claim 4, wherein the other of two selected gear-change points on the characteristic has, for the parameter associated with the engine torque, a coordinate value which falls within a full-load range of the characteristic.

6. The process according to claim 1, wherein one of the selected adjacent gear-change points on a characteristic has, for the parameter dependent on the speed of travel, a coordinate value which falls within an idling range of the characteristic.

7. The process according to claim 6, wherein the other of the selected gear-change points on the characteristic has, for the parameter dependent on the speed of travel, a coordinate value which falls within a full-load range of the characteristic.

8. The process according to claim 1, wherein adaptation of the coordinate value of the parameter dependent on the speed of travel is performed by adding a correction value to the coordinate value which falls within an idling range.

9. The process according to claim 8, wherein a predetermined auxiliary coordinate value for the parameter associated with the engine torque is used for adapted coordinate values of the parameter dependent on the speed of travel which lie above an unadapted characteristic, and wherein the auxiliary coordinate value limits the portion of the unadapted characteristic which is determined by the adapted coordinate value.

10. A process for controlling gear shifting in a motor vehicle by cyclic adaptation of a gear change characteristic in an automatic gearbox thereof, the process comprising the steps of:

providing a characteristic map in which a parameter dependent on a travel speed of the vehicle is plotted against a parameter associated with an engine torque, and which contains a characteristic that has gear change points defined by coordinate values in said map;

adapting said characteristic to a change in influencing variables as a function of correction values, by means of a gear-change strategy which determines the correction values by evaluating measured actual values of the influencing variables using an algorithm which correlates vehicle-specific and driving-state-specific ones of said influencing variables, in successive computational cycles; and controlling gear changing in said vehicle as a function of the adapted characteristic;

wherein said correction values are established for each of two coordinate values of selected gear-change points of said characteristic;

wherein the characteristic map has a kick-down gear-change point which does not belong to the characteristic and which has a constant auxiliary coordinate value for the parameter associated with the engine torque; and wherein an additional correction value is established by the gear-change strategy in successive computational cycles, and in each case only the coordinate value of the kick-down gear-change point associated with the parameter dependent on the speed of travel is adapted by the additional correction value.

11. The process according to claim 10, wherein a first kick-down gear-change point is assigned, as regards its coordinate value for the parameter dependent on the speed of travel, to a first characteristic for changes into the higher of two adjacent gears; wherein a second kick-down gear-change point is assigned, as regards its coordinate value for the parameter dependent on the speed of travel, to a second characteristic for changes into the lower of the two adjacent gears; and wherein respective additional correction values are determined for those coordinate values of the two kick-down gear-change points which are associated with the parameter dependent on the speed of travel.

12. Computer apparatus for controlling gear shifting in a vehicle, comprising:

a computer readable medium having stored therein a characteristic map in which a parameter dependent on a travel speed of the vehicle is plotted against a parameter associated with an engine torque, and which contains at least one characteristic that has gear change points defined by coordinate values in said map;

a computer readable medium encoded with a computer program, said computer program including instructions for:

adapting said at least one characteristic to a change in influencing variables as a function of correction values, by means of a gear-change strategy which determines the correction values by evaluating measured actual values of the influencing variables, using an algorithm which correlates vehicle-specific and driving-state-specific ones of said influencing variables, in successive computational cycles; and issuing gear change signals for controlling gear changing in said vehicle as a function of said adapted characteristic;

wherein said correction values are established for each of two coordinate values of selected gear-change points of said characteristic; and wherein a common correction value is determined for selected adjacent gear-change points, said common correction value serving to adapt the coordinate values of said selected adjacent gear change points, for the parameter associated with the engine torque.

13. The process according to claim 1 wherein:

the common correction value is established in an n-th computational cycle; and an area of the adapted characteristic between the selected adjacent gear change points is displaced translatorily in an (n+1)th computational cycle, by an amount corresponding to the common correctional value in the n-th computational cycle.

* * * * *